W. C. WHINCUP.
DEVICE TO FASTEN A CAMERA TO A TRIPOD.
APPLICATION FILED OCT. 22, 1915.
1,179,150.
Patented Apr. 11, 1916.
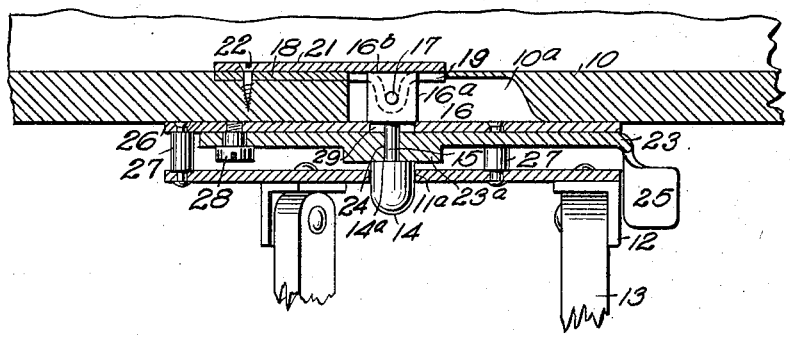
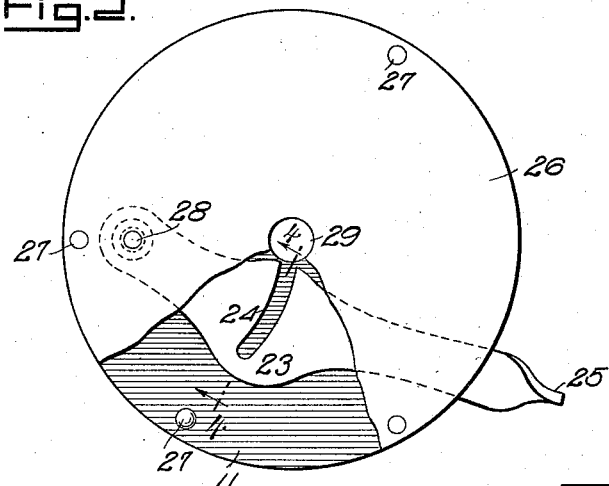
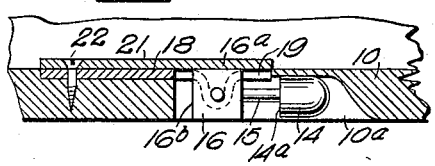
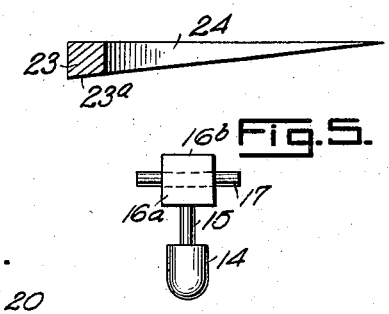
WITNESSES
INVENTOR
William C. Whincup
BY
ATTORNEYS
THE COLUMBIA PLANOGRAPH CO., WASHINGTON, D. C.

UNITED STATES PATENT OFFICE.

WILLIAM C. WHINCUP, OF ROCHESTER, NEW YORK.

DEVICE TO FASTEN A CAMERA TO A TRIPOD.

1,179,150.  Specification of Letters Patent.  Patented Apr. 11, 1916.

Application filed October 22, 1915. Serial No. 57,261.

*To all whom it may concern:*

Be it known that I, WILLIAM C. WHINCUP, a citizen of the United States, and a resident of Rochester, in the county of Monroe and State of New York, have invented a new and Improved Device to Fasten a Camera to a Tripod, of which the following is a full, clear, and exact description.

My invention has for its object to provide a practical device as a substitute for the bolt and nut usually employed for fastening a camera to a tripod.

The invention is characterized by co-acting fastener elements attachable respectively to the base of a camera and to the top of a tripod. The camera element in the preferred form is mounted to rock through an angle of 90 degrees to assume a position pendent below the camera base or a position housed within the camera base. The tripod element includes a cam lever which is sustained above the top of the tripod and has a transverse slot to receive the shank of the camera element and is wedge-shaped in cross section to exert a wedging and drawing action on a head provided on the camera element. The said head of the camera element is adapted to extend through the usual bolt hole in the tripod top to be held against lateral displacement in effecting an engagement of the co-acting fastener elements.

The invention will be more particularly explained in the specific description following.

Reference is to be had to the accompanying drawings forming a part of the specification in which similar reference characters indicate corresponding parts in all the views.

Figure 1 is a transverse vertical section showing my invention applied; Fig. 2 is a sectional plan view of the tripod features; Fig. 3 is a fragmentary detail in section of the camera element showing the same housed in the base of the camera; Fig. 4 is a cross section of the lever as indicated by the line 4—4, Fig. 2; Fig. 5 is a side elevation of the rockable element of the camera, the view being taken at right angles to Figs. 1 and 3; and Fig. 6 is a perspective view of the bearing plate preferably employed for the rockable element shown in Fig. 5.

A portion of a camera base 10, is conventionally illustrated together with tripod elements including a top 11, having brackets 12, at the underside to which the legs 13, are pivoted.

To the camera base 10, I fix a fastener element which includes in its entirety a head 14, carried by a shank 15, of reduced thickness, there being a block 16, from which the shank extends, said block having trunnions which may be formed by a separate pin or otherwise formed or secured on the said block. The trunnions 17, are rockably supported on the camera base; in the preferred form a wear-plate 18 is provided for the purpose, and is formed at one end with a longitudinal slot 19, the side arms or fork being bent to present depressions 20, in which the trunnions 17, are rockably received. A plate spring 21, is secured over the plate 18, the said spring and plate being fastened to the camera base in any suitable manner as by a screw 22. The block 16, has square faces 16$^a$, 16$^b$, at approximately right angles against which the spring 21, is adapted to bear.

With the described arrangement, the fastener element may be swung on the trunnions 17, to a pendent position perpendicular to the camera base 10, and to the spring 21, in which position said spring bears against the face 16$^b$. When the camera is not to be supported on the tripod, the described fastener element may be swung into the recess 10$^a$, so as to lie within the plane of the base, in which position the spring 21 bears against the face 16$^a$.

The lever 23, is formed with a transverse arcuate slot 24, and has increased thickness and is wedge-shaped in cross section at 23$^a$, adjacent to the slot 24. The free end of the lever is suitably formed with a finger piece 25$^a$, for throwing the lever. To support the lever on a tripod, a top plate 26, is provided which is supported by shouldered rivets 27, or equivalent means so as to be disposed in a plane parallel with the top 11, of the tripod, and spaced from the same. The lever is secured to the underside of the plate 26, by a screw 28, or the like, which serves as a fulcrum for the lever, also, it is to be observed that the top plate 26, has a hole 29 therein, through which the head 14, of the camera is adapted to pass. The said camera element is of a length so that the head 14, thereof, will extend through the usual bolt-hole 11$^a$, in the tripod top 11, and be snugly accommodated in the said bolt-hole while the shank 15, will be disposed in the path of movement of the lever 23.

It will be clear from the foregoing that to secure the camera to the tripod, it will be necessary only to swing the camera element to the pendent position, Fig. 1, and enter said element through the holes 29 and 11ª, in the tripod whereupon the lever 23 may be swung so that the shank 15, is received in the arcuate slot 24. The cam surface 23ª, on the lever contacting with the shoulder 14ª, will exert a wedging action on the said head and draw the camera tightly to the plate 26. Thus, only a simple throwing of the lever 23, in either direction serves to engage or disengage the head 14 so that the camera can be secured or removed instantly. The wall of the hole 11ª maintains the head 14 in position and resists pressure thereon by the lever 23, so that said head is held against lateral displacement while being engaged by the lever.

Having thus described my invention I claim as new, and desire to secure by Letters Patent:

1. The combination with a tripod, of means to fasten a camera thereto, said means comprising an element including a shank formed with a head and means to secure the same in depending position on a camera, and a co-acting fastener element including a lever, a plate to which said lever is fulcrumed at the underside of the plate, said plate having a vertical hole for the passage therethrough of the first-mentioned element; means securing the said plate to tripod and serving to space the plate from the top of the tripod to afford clearance for the lever, said lever being adapted to swing transversely of the first element and having an arcuate slot to receive the said shank, the lever furthermore presenting a transversely disposed wedge surface adapted to contact with the said head.

2. A fastener of the character described, comprising co-acting fastener elements applicable respectively to structures to be fastened together, one of said elements comprising a shank having a head at one end, and the other end having trunnions, means to rockably support the trunnions on one of the structures to be fastened, and a spring adjacent to said trunnions, the said fastener element having surfaces at approximately right angles to receive the pressure of said spring for maintaining the fastener element either perpendicular to the spring or approximately parallel therewith; the other fastener element including a cam lever and means to fulcrum the lever on the other structure to be fastened, said lever having a transverse arcuate slot to receive the said shank and being wedge-shaped in cross section adjacent to the slot to exert a wedging action on the said head.

3. A fastener including a slotted plate having bearings at the sides of the slot, a plate spring covering said slot, a fastener element having trunnions rockable in said bearings, said element having surfaces adjacent to the trunnions and in planes approximately at right angles to receive the pressure of the said spring and position the fastener element perpendicular to the spring or approximately parallel therewith, the free end of the fastener element having a head and a shank of less thickness than the head; together with a co-acting fastener element including a cam lever movable transversely of the head into engagement with the latter when the first fastener element is perpendicular to the spring.

In testimony whereof I have signed my name to this specification in the presence of two subscribing witnesses.

WILLIAM C. WHINCUP.

Witnesses:
BERTHA E. GRAM,
B. M. LANPHERE.

Copies of this patent may be obtained for five cents each, by addressing the "Commissioner of Patents, Washington, D. C."